US010828777B2

(12) United States Patent
Scheurer et al.

(10) Patent No.: US 10,828,777 B2
(45) Date of Patent: Nov. 10, 2020

(54) METHOD FOR THE REDUNDANCY-OPTIMIZED PLANNING OF THE OPERATION OF A MOBILE ROBOT

(71) Applicant: KUKA Deutschland GmbH, Augsburg (DE)

(72) Inventors: Christian Scheurer, Augsburg (DE); Shashank Sharma, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 262 days.

(21) Appl. No.: 15/739,543

(22) PCT Filed: Jun. 7, 2016

(86) PCT No.: PCT/EP2016/062918
§ 371 (c)(1),
(2) Date: Dec. 22, 2017

(87) PCT Pub. No.: WO2016/206968
PCT Pub. Date: Dec. 29, 2016

(65) Prior Publication Data
US 2018/0186001 A1   Jul. 5, 2018

(30) Foreign Application Priority Data

Jun. 25, 2015   (DE) .................. 10 2015 211 865

(51) Int. Cl.
*B25J 9/16* (2006.01)
*B25J 5/00* (2006.01)

(52) U.S. Cl.
CPC .............. *B25J 9/1664* (2013.01); *B25J 9/162* (2013.01); *B25J 9/1643* (2013.01); *B25J 5/007* (2013.01)

(58) Field of Classification Search
CPC ..... B25J 5/007; B25J 5/00; B25J 9/162; B25J 9/1664; B25J 9/1666; G05B 2219/40298; G05B 2219/39022
(Continued)

(56) References Cited

U.S. PATENT DOCUMENTS 4,954,962 A  *  9/1990  Evans, Jr. ............ G05D 1/0274
                                                            701/28
5,413,454 A  *  5/1995  Movsesian ............... B25J 5/007
                                                           294/100
(Continued)

FOREIGN PATENT DOCUMENTS

DE       10229293 A1    1/2004
DE    102011106321 A1   1/2013
(Continued)

OTHER PUBLICATIONS

European Patent Office; Search Report and Written Opinion in International Patent Application No. PCT/EP2016/062918 published Sep. 14, 2016; 12 pages.
(Continued)

*Primary Examiner* — Dalena Tran
(74) *Attorney, Agent, or Firm* — Dorton & Willis, LLP (57) ABSTRACT

A method for redundancy-optimized planning of the operation of a redundant mobile robot having a robot arm includes using a tool center point (TCP) associated with the robot arm and assigned a Cartesian TCP coordinate system having a first, second, and third TCP-coordinate axes; using a Cartesian world coordinate system having first, second, and third world coordinate axes, wherein the first and second world coordinate axes span a plane on which the mobile robot moves, a height of the TCP from which the plane is assigned, and one of the TCP coordinate axes and the plane enclose an angle; creating at least one graph wherein a redundancy is presented as a function of the height and the angle, wherein
(Continued)

the redundancy is a measure of possible configurations of the mobile robot depending on the height and the angle; and planning operation of the mobile robot using the graph.

12 Claims, 6 Drawing Sheets

(58) Field of Classification Search
USPC ....... 700/245, 247, 250, 251, 253, 262, 263; 901/1, 2, 14, 16, 46; 318/568.11, 568.1, 318/568.13, 568.15, 568.21, 568.22; 701/23, 25
See application file for complete search history.

(56) References Cited

U.S. PATENT DOCUMENTS

| | | |
|---|---|---|
| 5,550,953 A | 8/1996 | Seraji |
| 7,756,606 B2 | 7/2010 | Nakajima et al. |
| 2011/0224815 A1* | 9/2011 | Sonner .................. B25J 9/1664 700/97 |
| 2013/0103192 A1* | 4/2013 | Huettenhofer ........... B25J 9/162 700/245 |
| 2013/0310982 A1* | 11/2013 | Scheurer ................ B25J 9/1664 700/263 |

FOREIGN PATENT DOCUMENTS

| | | |
|---|---|---|
| DE | 102011084412 A1 | 4/2013 |
| DE | 102012208094 A1 | 11/2013 |
| EP | 2485875 B1 | 4/2013 |
| EP | 2664420 A2 | 11/2013 |

OTHER PUBLICATIONS

German Patent Office; Office Actio in related German Patent Application No. 10 2015 211 865.7 dated Oct. 26, 2015; 4 pages.
Patel Sarosh et al; Publication entitled"Manipulator Performance Measures—A Comprehensive Litertaure Survey" published Feb. 15, 2014; 39 pages.

* cited by examiner

METHOD FOR THE REDUNDANCY-OPTIMIZED PLANNING OF THE OPERATION OF A MOBILE ROBOT

CROSS-REFERENCE

This application is a national phase application under 35 U.S.C. § 371 of International Patent Application No. PCT/EP2016/062918, filed Jun. 7, 2016 (pending), which claims the benefit of German Patent Application No. DE 10 2015 211 865.7 filed Jun. 25, 2015, the disclosures of which are incorporated by reference herein in their entirety.

TECHNICAL FIELD

The invention relates to a method for the redundancy-optimized planning of the operation of a mobile robot.

BACKGROUND

U.S. Pat. No. 5,550,953 discloses a mobile robot and a method for operating the mobile robot. The mobile robot comprises a robot arm with several members, which are movable relative to each other, and a carrier vehicle to which the robot arm is fastened.

SUMMARY

The object of the invention is to provide an improved method for planning the movement of a mobile robot. The object of the invention is achieved by a method for redundancy optimized planning of an operation of a redundant mobile robot, which is connected to a mobile carrier vehicle, a robot arm with several members connected via joints, pivotable mounting with respect to axes of rotation, drives for moving the members relative to each other, and an electronic control device which is arranged to control the drives for the members and the carrier vehicle for the movement of the mobile robot, comprising the following method steps:

Use of a tool center point that is assigned to the robot arm, assigned Cartesian TCP coordinate system with a first TCP coordinate axis, a second TCP coordinate axis and a third TCP coordinate axis, Using a Cartesian world coordinate system having a first world coordinate axis, a second world coordinate axis and a third world coordinate axis, whereby the first world coordinate axis and the second world coordinate axis span a plane, on which the mobile robot moves, a height of the tool center point from the plane of the third world axis is assigned, and one of the TCP coordinate axes and the plane enclose an angle, Creating at least one graph in which a redundancy is presented as a function of the height and the angle, whereby the redundancy is a measure of possible configurations of the mobile robot depending on the height and angle, and Planning an operation of the mobile robot with the help of the least one graph.

The mobile robot is a redundant mobile robot, for which there are generally several possible configurations of the mobile robot for the respective positions and orientations of the tool center point in space. The configuration of the mobile robot entails that for the respective positions and orientations of the tool center points there are several possible positions and orientations of the robot arm and several possible positions of the carrier vehicle in the plane.

The positions of the robot arm arise from the angular positions of the individual members relative to each other.

There are thus generally redundant configurations of the mobile robot for the individual positions and orientations of the tool center point in space. The positions and orientations can be expressed, for example, in the world coordinate system. The orientation of the tool center point can also be expressed in coordinates of the TCP coordinate system.

According to a preferred implementation of the invention, the robot arm comprises exactly five degrees of freedom and thus has as members a first member, a second member, a third member, a fourth member, a fifth member and a sixth member, and as axes of rotation a first axis of rotation, a second axis of rotation, a third axis of rotation, a fourth rotation axis of rotation and a fifth axis of rotation. In this case, the mobile robot has in particular eight degrees of freedom because the carrier vehicle comprises three degrees of freedom.

Preferably, the first axis of rotation, the second axis of rotation and the fourth axis of rotation are horizontal, and the fifth axis of rotation is vertical. In particular, the second member is pivotable relative to the first member with respect to the first axis of rotation, the second member is followed by the third member, the third member is pivotable relative to the second member with respect to the second axis of rotation, the fourth member is pivotable relative to the third member with respect to the third axis of rotation, which is perpendicular to the second axis of rotation, and it comprises a fastening device for fastening a tool or the tool, the sixth member is mounted immovably on the carrier vehicle or represents the carrier vehicle, the fifth member is pivotable relative to the sixth member with respect to the fifth axis of rotation, and the first member is pivotable relative to the fifth member with respect to the fourth axis of rotation. Preferably, the third TCP coordinate axis extends in the direction of the third axis of rotation and encloses an angle with the plane.

The robot arm can also have four degrees of freedom. Then, the robot arm comprises a first member, a second member, a third member, a fourth member, and a fifth member, and as axes of rotation a first axis of rotation, a second axis of rotation, a third axis of rotation and a fourth axis of rotation. In particular, the first rotation axis, the second axis of rotation and the fourth axis of rotation are horizontal. In particular, the second member is pivotable relative to the first member with respect to the first axis of rotation, the second member is followed by the third member, the third member is pivotable relative to the second member with respect to the second axis of rotation, the fourth member is pivotable relative to the third member with respect to the third axis of rotation, which is perpendicular to the second axis of rotation, and it comprises a fastening device for fastening a tool or the tool, the fifth member is mounted immovably on the carrier vehicle or represents the carrier vehicle. Preferably, the third TCP coordinate axis extends in the direction of the third axis of rotation and forms an angle with the plane.

The mobile carrier vehicle preferably comprises wheels and drives for driving the wheels. Preferably an electronic control device has been set up to control the drives for the wheels to move the carrier vehicle.

The carrier vehicle may also comprise legs or be implemented as a magnetic levitation transport vehicle.

The carrier vehicle is preferably implemented as an omni-directionally movable carrier vehicle (holonomic platform). Preferably therefore, the wheels of the carrier vehicle are implemented as omnidirectional wheels. An example of an omnidirectional wheel is known to professionals as the Mecanum wheel. Due to the omnidirectional wheels, the mobile robot or its carrier vehicle according to the invention, can move freely in space. Thus the carrier vehicle can not only move forward, backward or sideways or along curves, but it can for example also rotate around a vertically oriented axis.

According to the invention, at least one graph is used, in which the redundancy is presented as a function of the height and the angle, whereby the redundancy is a measure for possible configurations of the mobile robot depending on the height and the angle. This makes it possible to relatively easily visualize the possible configurations of the mobile robot inter alia for the height of the tool center point, thereby simplifying the planning of the operation of the mobile robot.

The at least one graph, for example, is a first graph, whereby the height, the angle and the redundancy form a three dimensional cartesian coordinate system in which the redundancy is depicted as a function of the height and angle as the first graph. This results in a graphic mountain range, in which it is possible to quite easily read the different heights of the tool center point and the angle.

Preferably, the redundancy in the first graph is marked differently in color or grayscales.

According to a preferred implementation of the method according to the invention, the at least one graph is a second graph, in which the height is depicted as a function of the angle, and the redundancy in the second graph is marked differently, in particular with a different color or by means of grayscales, to represent the redundancy as a function of the height and angle. The second graph is a two-dimensional graph in which preferably the height and the angle are plotted along corresponding coordinate axes, which are orthogonal.

The second graph shows in particular the height as a function of the angle. To visualize the redundancy, the second graph is marked differently, for example by using different colors or different grayscales to visualize the redundancy. The second graph is in particular a plan view of the first graph. In the second graph it is relatively easy to determine possible (Z; β) pairs or (Z; β) pairs with relatively high redundancy.

The method according to the invention may include the following additional method steps:

Planning a trajectory of a track in six-dimensional space, along which the tool center point is to move automatically, Transforming the trajectory of the planned path in a two-dimensional subspace, whereby the trajectory of a transformed path is created, whereby the subspace represents the planned position and orientation of the tool center point in height and angle, Overlaying the trajectory of the transformed planned path with the second graph, and on the basis of the superimposed trajectory of the transformed track with the second graph, determining whether the planned trajectory can be followed by the mobile robot.

Planning within the six-dimensional space is carried out in particular in coordinates of the world coordinate system (world coordinates) and possibly also in the TCP coordinate system.

If the planned trajectory cannot be followed by the mobile robot, the following method steps can be performed:

Change the trajectory of the transformed planned path within the superimposed second graph, so that a revised trajectory of the transformed planned path is created, which the mobile robot can follow, and Create a revised planned trajectory in six-dimensional space, based on the revised trajectory of the transformed planned path.

The method according to the invention may include the following additional method steps:

Defining a height for the tool center point

With the aid of the first graph and/or the second graph, determining possible values of the angle, Determining the value of the angle, to which the highest redundancy is assigned, and Using the determined value of the angle for planning the movement of the mobile robot.

Alternatively, the method according to the invention may comprise method steps:

Determining an angle,

With the aid of the first graph and/or the second graph, determining possible values of the height, Determining the value of the height, to which the highest redundancy is assigned, and Using the determined value of the height for planning the movement of the mobile robot.

When determining the value of the angle or the height, to which the highest redundancy is assigned, it is possible to consider at least one further constraint, such as avoiding collisions of the mobile robot with an object or a safety distance of the mobile robot to an object.

By means of the at least one graph, it is also possible to plan the following task for the mobile robot: The mobile robot is to use a tool implemented as a gripper to grip a workpiece and place it in another position. By means of at least one graph it is possible to determine favorable positions for this task.

BRIEF DESCRIPTION OF THE DRAWINGS

Implementation examples of the invention are shown in the attached schematic drawings.

DETAILED DESCRIPTION

Figure 1:
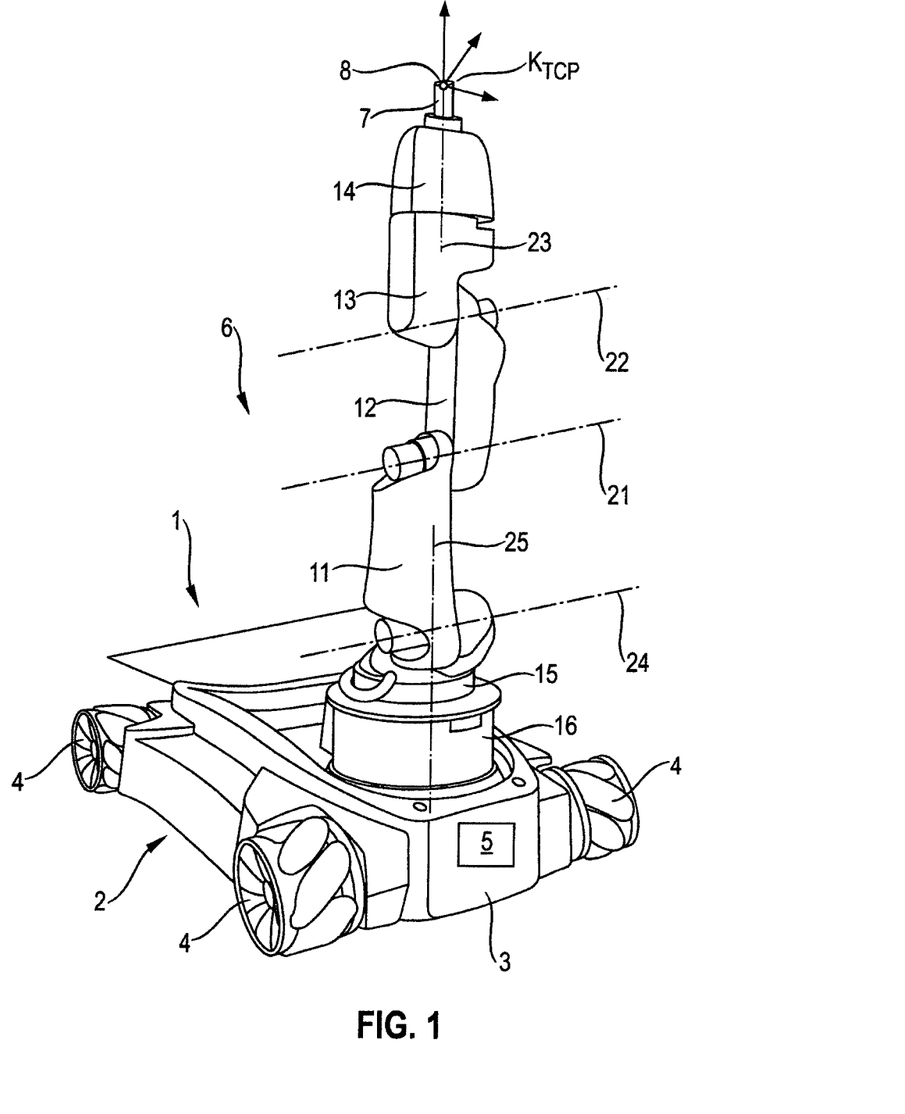
FIG. 1 depicts a mobile robot, which comprises a carrier vehicle and a robot arm affixed to the carrier vehicle.

FIG. 1 shows a mobile robot 1, which in the case of the present embodiment example exhibits an omnidirectional mobile carrier vehicle 2. This example comprises a vehicle base frame 3 and several wheels 4 pivotably arranged on the vehicle base frame 3, which are implemented as omnidirectional wheels. In the case of the present implementation example, the carrier vehicle 2 exhibits four omnidirectional wheels 4. Preferably all wheels 4 are driven by one drive each. The drives, not shown in detail here, are preferably electric drives, in particular controlled electric drives, and are connected to a control device 5 which can, for example, be arranged in or on the vehicle base frame 3, whereby the control device is set up to control the drives so that these can move the wheels.

An example of an omnidirectional wheel is the so-called Mecanum wheel. In the present implementation example, each of the wheels 4 implemented as omnidirectional or Mecanum wheels exhibits two rigidly interconnected wheel discs, between which several rolling elements are pivotably mounted with respect to their longitudinal axes. The two wheel discs can be pivotably mounted with respect to a rotational axis, and can be driven by one of the drives of the carrier vehicle 2 in such a way that the two wheel discs rotate with respect to the axis of rotation.

The omnidirectional wheels 4 allow the mobile robot 1 or its carrier vehicle 2 to move freely on a plane or a ground, which is not shown in detail. Thus the carrier vehicle 2 can not only move forward, backward or sideways or along curves, but it can for example also rotate around an arbitrary vertically oriented axis.

The mobile robot 1 comprises a robot arm 6, which is implemented as serial kinematics and has several members arranged one after the other, which are connected to joints, so that the individual members are, with respect to the axes of rotation, mounted pivotably relative to each other.

In the case of the present implementation, the robot arm 6 has five degrees of freedom and comprises a first member 11, a second member 12, a third member 13, a fourth member 14, a fifth member 15 and a sixth member 16 and a first axis of rotation 21, a second axis of rotation 22, a third axis of rotation 23, a fourth axis of rotation 24 and a fifth axis of rotation 25.

In the case of the present implementation example, the first axis of rotation 21 and the second axis of rotation 22 are horizontal. The second member 12 is in particular a boom and is, relative to the first member 11, pivotably mounted with respect to the first axis of rotation 21.

The second member 12 is followed by the third member 13. The third member 13 is, relative to the second member 12, pivotably mounted with respect to the second axis of rotation 22.

In the case of the present embodiment example, the fourth member 14 is, relative to the third member 13, pivotably mounted with respect to the third axis of rotation 23. The third axis of rotation 23 is perpendicular to the second axis of rotation 22. The fourth member 14 may comprise a fixing device for fixing a tool 7. However, in the case of the present implementation example, the tool 7 is part of the fourth member 14. The fourth member 14 is one of the ends of the robot arm 6.

It is also possible that the robot arm 6 does not include the fourth member 14, and that the third member 13 comprises the fastening device or the tool 7. In this case, the third member 13 serves as one of the ends of the robot arm 6.

The first member 11, which is in particular a rocker of the robot arm 6, is arranged preceding the fifth member 15. The first member 11 is, relative to the fifth member 15, mounted pivotably relative to the fourth axis of rotation 24. The fourth axis of rotation is horizontal.

The sixth member 16 is in particular a rack of the robot arm 6, with which the robot arm 7 is fastened to the vehicle frame 3. The rack forms one of the ends of the robot arm 6. However, it is also possible that the carrier vehicle 2 forms the rack, i.e. the sixth member 16.

The fifth member 15 is in particular a carousel, which, relative to the rack, is pivotably mounted around the fifth axis of rotation 25. The fifth axis of rotation is vertical.

In the case of the present embodiment example, the carrier vehicle 2 is omnidirectionally movable, which is why the carrier vehicle 2 can also rotate around the fifth axis of rotation 25. It may also be provided that the first member 11 directly follows the rack, i.e. that it is, relative to the rack, pivotably mounted with respect to the fourth axis of rotation 24. In this case, the robot arm 7 does not comprise a carousel.

The mobile robot 1 further comprises drives connected to the control device 5. In the case of the present implementation example, the drives are electric drives, in particular controlled electric drives. At least the motors of these electric drives are arranged in or on the robot arm 6.

When the robot 1 is in operation, it is provided that the control device 5 controls the drives of the mobile robot 1, i.e. the drives for moving the members of the robot arm 6 and the drives for moving the wheels 4 in such a way that a so-called tool center point 8 assigned to the robot arm 8 takes a predetermined nominal position where necessary also a nominal orientation in space or rather the tool center point 8 moves automatically on a predetermined path.

In the case of the present implementation, the robot arm 6 has five degrees of freedom. The entire mobile robot 1 thus comprises eight degrees of freedom because the carrier vehicle 2 comprises three degrees of freedom.

Figure 2:
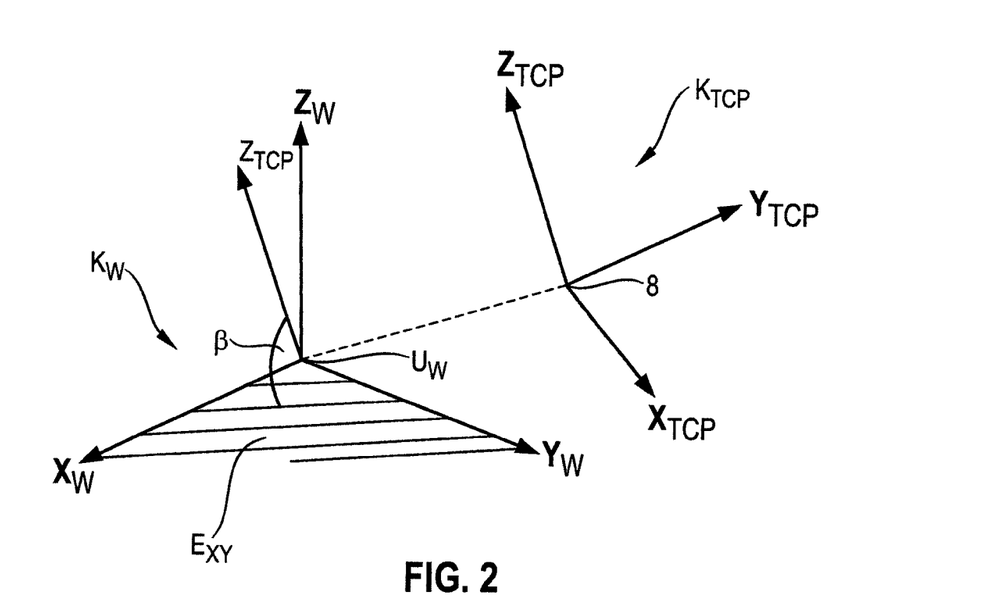
FIG. 2 depicts a world coordinate system and a TCP coordinate system

The position of the tool 7 or the tool center point 8 can be determined in coordinates of a world coordinate systems $K_W$ shown in FIG. 2. The world coordinate system $K_W$ Kw is a cartesian coordinate system with the world coordinate axes $X_W$, $Y_W$, $W_W$ and an origin $U_W$. The world coordinate system $K_W$ is stationary.

In the case of the present embodiment, the world coordinate system $K_W$ is defined such that its world coordinates $X_W$ and $Y_W$ span open a plane $E_{XY}$ on which the mobile robot 1 moves. The coordinate of the $Z_W$ world coordinate axis thus yields the height Z of the tool center point 8 of the plane $E_{XY}$, on which the mobile robot 1 moves.

The orientation of the tool center point 8 can be determined by angular coordinates of the world coordinate system $K_W$.

Assigned to the tool 7 or rather the tool center point 8, FIG. 2 also shows a TCP coordinate system $K_{TCP}$ whose origin is in the tool center point 8. The TCP coordinate system $K_{TCP}$ is a cartesian coordinate system with the TCP coordinate axes $X_{TCP}$, $Y_{TCP}$, $Z_{TCP}$. The $Z_{TCP}$-TCP coordinate axis is perpendicular to the second axis of rotation 22 or rather extends in the direction of the third axis of rotation 23, basically "in the impact direction" of tool 7.

Using the TCP coordinate system $K_{TCP}$, it is also possible to determine the orientation of the tool center point 8 with respect to the world coordinate system $K_W$.

In the case of the present implementation example, the TCP coordinate axes $Z_{TCP}$ and the plane $E_{XY}$ enclose an angle β.

In the case of the present implementation example, for example, an automatic movement of the tool 7 or the tool center points 8 along the height Z at a fixed position in the plane $E_{XY}$ determined by the $X_W$ and $Y_W$ world coordinate axes of the world coordinate system $K_W$ is to be planned, preferable offline. The height Z corresponds to the $Z_W$ world coordinate of the world coordinate system $K_W$.

In the case of the present implementation example, for this plan, the positions and orientations of the tool center points 8 with respect to the world coordinate system $K_W$ are transformed into a two-dimensional subspace, whose coordinates are the height Z of the tool center point 8 and the angle β.

As already mentioned, the mobile robot has eight degrees of freedom. The mobile robot 1 is a redundant mobile robot, for which there are generally several possible configurations of the mobile robot 1 for the respective positions and orientations of the tool center point in space, i.e. several possible positions of the robot arm 6 and several possible positions and orientations of the carrier vehicle 2 within the plane $E_{XY}$. The positions of the robot arm 6 arise from the angular positions of the individual members relative to each other.

It is thus possible to assign to the individual orientations and positions of the tool center point 8 in space a measure for the possible configurations of the mobile robot 1, depending on the height Z and the angle β. In the following this is referred to as redundancy P. A redundancy P can thus be respectively assigned to certain pairs (Z; β).

In the case of the present implementation example, the operation of the mobile robot 1 is planned with the aid of at least one graph, in which the redundancy P is represented as a function of the height Z and the angle β.

Figure 3:
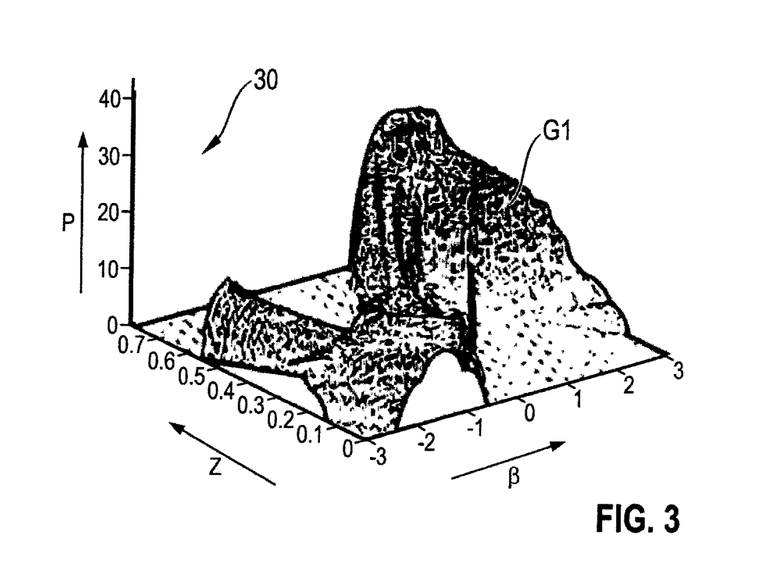
FIGS. 3, 4 depict respectively one graph.

FIG. 3 shows how the height Z, the angle β and the redundancy P can in particular form a three-dimensional coordinate system 30, in which, in a first graph G1, the redundancy P is shown as a function of the height Z and the angle β. The first graph G1 is a three-dimensional graph. The greater the value of the redundancy P, the greater is the number of possible configurations of the mobile robot 1, in which the tool center point 8 can assume a certain height Z with a certain angle β. The height Z may, for example, be entered as a normalized value, for which Z=1.0 is the maximum height which the tool center point 8 can reach due to the geometric extension of the mobile robot 1.

To illustrate the first graph G1 even more, the latter can be color-marked, whereby (Z; β) pairs with a higher redundancy P are color-marked differently from (Z; β) pairs with lower redundancy P. (Z; β) pairs for which there are no possible configurations because of the the spatial extension of the robot 1, can be marked in another color.

Figure 4:
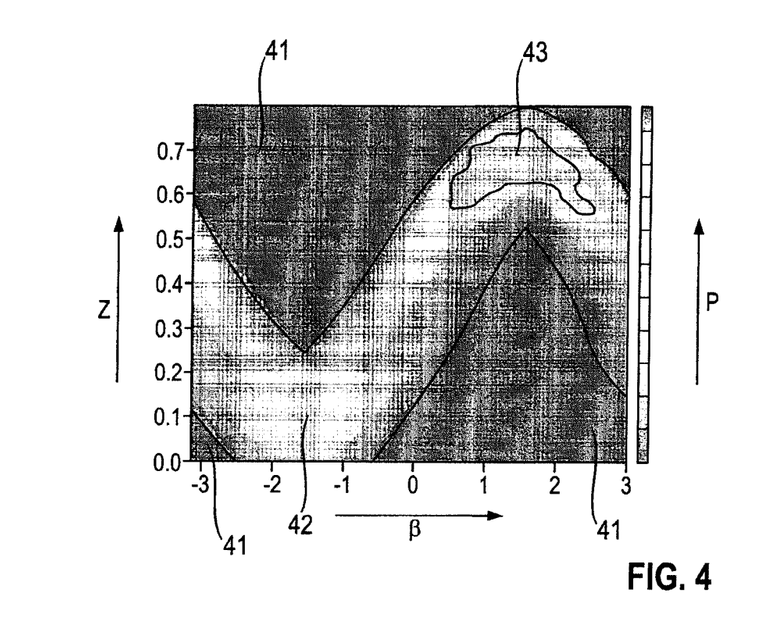

The height Z, the angle β and the redundancy P can be illustrated as a two-dimensional graph (second graph G2) as shown in FIG. 4. The second graph G2 shows the height Z as a function of the angle β. To visualize the redundancy P, the second graph G2 is marked differently, for example by using different colors or different grayscales to visualize the redundancy P.

The second graph G2 is in particular a plan view of the first graph G1. In the second graph G2 it is relatively easy to determine possible (Z; β) pairs or (Z; β) pairs with relatively high redundancy P.

The second graph G2 comprises, for example, first areas 41, to which (Z; β) pairs are assigned, for which no configurations of the mobile robot 1 are possible, second areas 42, to which (Z; β) pairs are assigned, for which configuration of the mobile robot 1 with relatively low redundancy P are possible, and third areas 43, to which (Z; β) pairs are assigned, for which configurations of the mobile robot 1 with relatively high redundancy P are possible.

Figure 5:
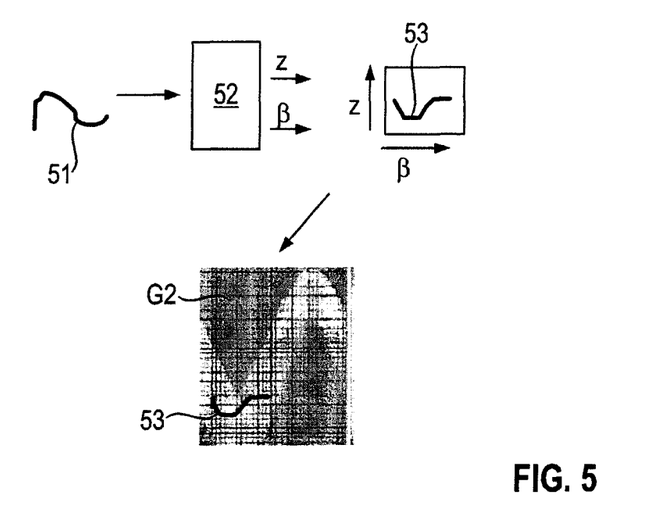
FIGS. 5, 6 depict an illustration for checking the trajectory of a planned path.
Figure 6:
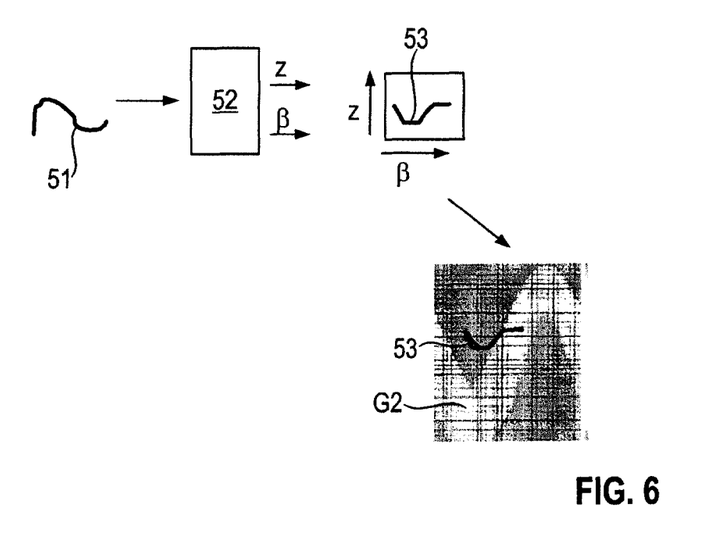

FIGS. 5 and 6 illustrate how, based on the second graph G2, it can be checked whether the trajectory of a planned path for the tool center point 8 can be performed with the mobile robot 1.

First, the trajectory 51 of a path is planned in six-dimensional space, along which the tool center point 8 is to move automatically. The trajectory 51 of the path in six-dimensional space is planned, for example, in world coordinates or in world and TCP coordinates, and comprises information about the course of the position and orientation of the tool center point 8 in space.

Next, the trajectory 51 of the planned path is transformed into the two-dimensional subspace by means of a transformation 52, whereby a transformed path is created, whose trajectory 53 can be represented graphically.

Next, the graphic trajectory 53 of the transformed planned path is superimposed on the second graph G2.

If the trajectory 51 of the planned path can be followed by the mobile robot 1, then the trajectory 53 of the transformed planned path is located within areas of the second graph G2, to which (Z; β) pairs are assigned, for which a configuration of the mobile robot 1 is possible. Such a case is shown in FIG. 5.

If the trajectory 51 of the planned path cannot be followed by the mobile robot 1, then the trajectory 53 of the transformed planned path is at least partly located within areas of the second graph G2, to which (Z; β) pairs are assigned, for which a configuration of the mobile robot 1 is impossible. Such a case is shown in FIG. 6.

Figure 7:
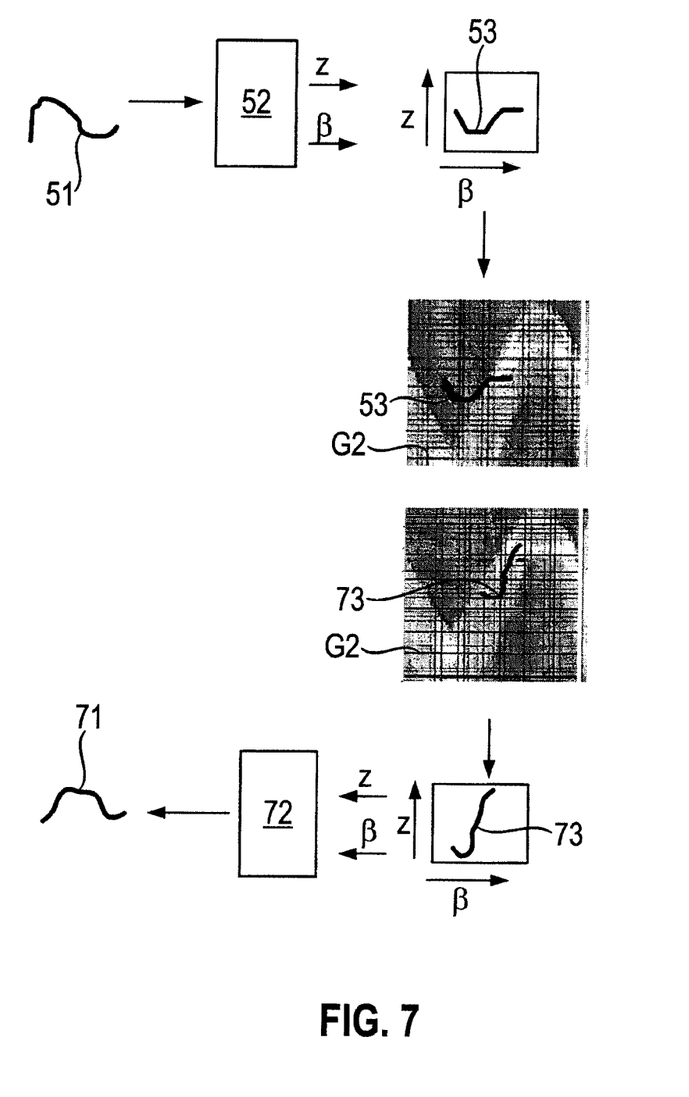
FIG. 7 depicts an illustration for revising the trajectory of a planned path.

If the trajectory 51 of the planned path cannot be followed by the mobile robot 1, then the trajectory 53 of the transformed planned path can be altered, so that a revised trajectory 73 of the transformed path is created, which can be followed by robot 1. This is illustrated in FIG. 7. The revised trajectory 53 of the transformed planned path is changed in the superimposed second graph G2, in order to be able to directly determine whether the revised trajectory 73 of the transformed planned path can be followed with the mobile robot 1. The trajectory of the transformed path can be changed, for example, by means of a cursor.

Next, the revised trajectory 73 of the transformed planned path is, by means of an inverse retransformation 72, transformed from the two-dimensional subspace back to the six-dimensional space, whereby a modified planned path is created, whose trajectory is marked by reference symbol 71 shown in FIG. 7 (revised trajectory 71 of the planned path). The mobile robot 1 can be correspondingly programmed on the basis of the revised planned path.

Figure 8:
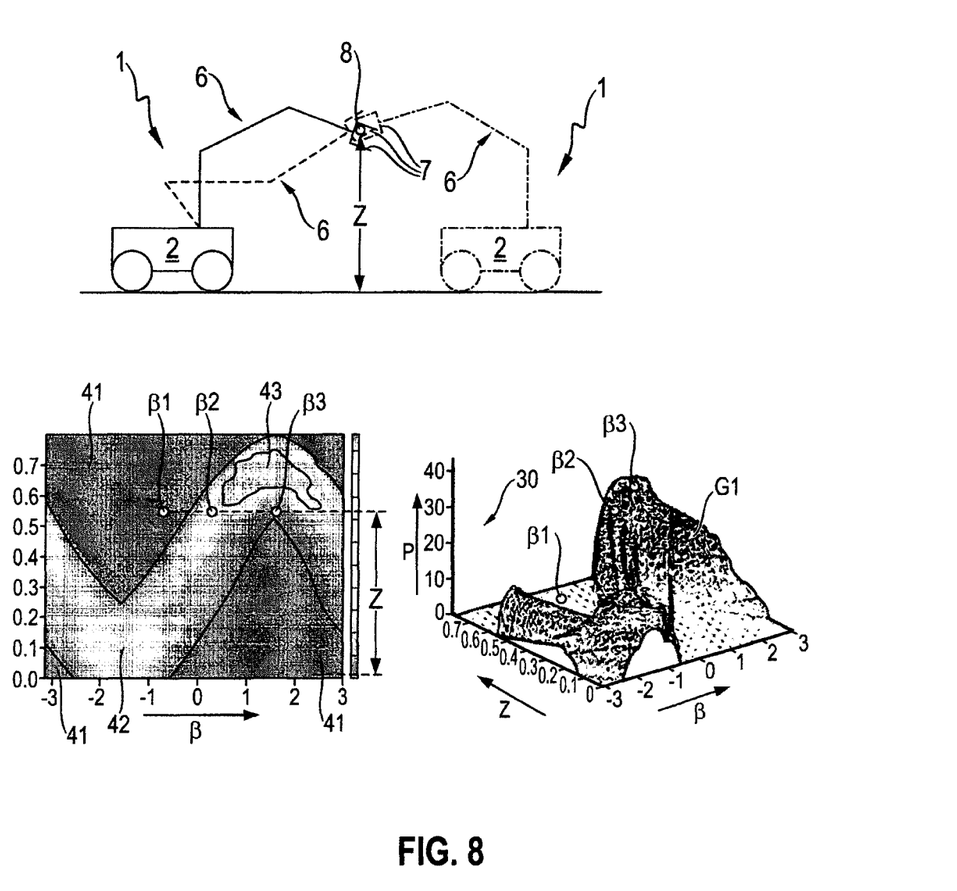
FIG. 8 depicts an illustration for planning a configuration for the mobile robot.

FIG. 8 illustrates an example of a configuration plan of the mobile robot 1, where the tool center point 8 is to assume a predetermined height Z. Due to the redundancy P, multiple angles 13 arise for this height Z. FIG. 8 shows the mobile robot 1 for three configurations of the mobile robot 1, in which the tool center point 8 assumes the same height Z, but with respectively different angles β.

In the example shown in FIG. 8, the carrier vehicle 2 assumes the same position and orientation for two configurations of the mobile robot 1, the angle settings of the members of the robot arm 6 differ relatively to each other. For these two configurations of the mobile robot 1, the carrier vehicle 2 is represented by solid lines and the robot arm 6 for a first configuration of the mobile robot 1 is also represented by a solid line, and for a second configuration of the mobile robot 1 by a dashed line.

The mobile robot 1 is represented by a dotted-dashed line for the third configuration of the mobile robot 1.

A value of β1 is obtained for the angle β for the first configuration of the mobile robot 1, a value of β2 is obtained for the angle β for the second configuration of the mobile robot 1, and a value of β3 is obtained for the angle β for the third configuration of the mobile robot 1. In FIG. 4, these values β1, β2, β3 are also shown in the first graph G1 and the second graph G2, so that one person can read the corresponding redundancies P for each of the angles β.

At a given height Z for gripping a workpiece with a tool 7 designed as a gripping device, there are several angles β for this gripper position. Due to the redundancy of the mobile robot 1, there are more favorable and less favorable configurations of the mobile robot 1, to which an angle β is assigned. By means of graphs G1 and G2 it is possible to compare different values of the angle β for the predetermined height Z with reference to the redundancy P.

With the help of graphs G1 and/or G2 it is thus possible to perform the following method:

First, height Z of the tool center point is 8 is determined.

Next, the first graph G1 and/or the second graph G2 are used to determine possible values $\beta 1$, $\beta 2$, $\beta 3$ of angle $\beta$. This can also be done in an automated process.

Next, that value of $\beta 1$, $\beta 2$, $\beta 3$ of angle $\beta$ is determined, to which the highest redundancy P has been assigned. Thus a pair (Z; $\beta$) is obtained, which is used for planning the movement of the mobile robot 1.

Alternatively, it is also possible to predetermine an angle $\beta$, in order to determine for this angle $\beta$ the height to which the highest redundancy has been assigned. Thus a pair (Z; $\beta$) is obtained, which is used for planning the movement of the mobile robot 1.

Using graphs G1 and G2 it is also possible to plan the following task for the mobile robot 1: The mobile robot 1 is to use a tool 7 embodied as a gripper to grip a workpiece and place it in another position. Graphs G1 and/or G2 can be used to determine favorable positions for this task.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for the redundancy-optimized planning of the operation of a redundant mobile robot, the mobile robot comprising a mobile carrier vehicle, a robot arm with a plurality of links connected by joints that pivotally mount the links with respect to axes of rotation, drives for moving the links relative to each other, and an electronic control device which is configured to control the drives for the links and the carrier vehicle for the movement of the mobile robot, the method comprising:

assigning a tool center point (TCP) of the robot arm to a TCP coordinate system having a first TCP-coordinate axis, a second TCP coordinate axis, and a third TCP coordinate axis;

identifying a Cartesian world coordinate system with a first world coordinate axis, a second world coordinate axis, and a third world coordinate axis;

wherein the first world coordinate axis and the second world coordinate axis span a plane on which the mobile robot moves, a height of the tool center point from the plane is defined along the third world coordinate axis, and the orientation of the tool center point is defined by an angle between the plane and one of the TCP coordinate axes;

creating at least one graph in which a redundancy of the robot is presented as a function of the height and the angle, wherein the redundancy is a measure of possible configurations of the mobile robot depending on the height and the angle;

planning an operation of the mobile robot with the help of the at least one graph;

wherein the at least one graph is a second graph in which the height is presented as a function of the angle, and the redundancy in the second graph is differently marked to present the redundancy as a function of the height and the angle;

planning a trajectory of a path in six-dimensional space along which the tool center point is to move automatically;

transforming the trajectory of the planned path in a two-dimensional subspace, whereby the trajectory of a transformed path is created, whereby the subspace represents the planned position and orientation of the tool center point in terms of the height and the angle;

overlaying the trajectory of the transformed planned path with the second graph; and on the basis of the superimposed trajectory of the transformed path with the second graph, determining whether the planned trajectory can be followed by the mobile robot.

2. The method of claim 1, wherein:

the robot arm has five degrees of freedom and includes a first link, a second link, a third link, a fourth link, a fifth link, and includes a sixth link, and as axes of rotation a first axis of rotation, a second axis of rotation, a third axis of rotation, a fourth axis of rotation, and a fifth axis of rotation;

the first axis of rotation, the second axis of rotation, and the fourth axis of rotation are horizontal, and the fifth axis of rotation is vertical;

the second link is pivotably mounted relative to the first link with respect to the first axis of rotation;

the second link is followed by the third link;

the third link is pivotably mounted relative to the second link with respect to the second axis of rotation;

the fourth link is pivotably mounted relative to the third link with respect to the third axis of rotation, which is perpendicular to the second axis of rotation;

the fourth link comprises a tool or a fastening device for fastening a tool;

the sixth link is immovably attached to the carrier vehicle or represents the carrier vehicle;

the fifth link is pivotably mounted relative to the sixth link with respect to the fifth axis of rotation;

the first link is pivotably mounted relative to the fifth link with respect to the fourth axis of rotation; and the third TCP coordinate axis runs in the direction of the third axis of rotation and encloses the angle made with the plane.

3. The method of claim 1, wherein:

the robot arm has four degrees of freedom and includes a first link, a second link, a third link, a fourth link, and a fifth link, and includes a first axis of rotation, a second axis of rotation, a third axis of rotation, and a fourth axis of rotation;

the first axis of rotation, the second axis of rotation, and the fourth axis of rotation are horizontal;

the second link is pivotably mounted relative to the first link with respect to the first axis of rotation;

the second link is followed by the third link;

the third link is pivotably mounted relative to the second link with respect to the second axis of rotation;

the fourth link is pivotably mounted relative to the third link with respect to the third axis of rotation, which is perpendicular to the second axis of rotation;

the fourth link comprises a tool or a fastening device for fastening a tool;

the fifth link is immovably attached to the carrier vehicle or represents the carrier vehicle; and the third TCP coordinate axis runs in the direction of the third axis of rotation and encloses the angle made with the plane.

4. The method of claim 1, wherein at least one of:
the carrier vehicle comprises wheels and drives for driving the wheels and the electronic device is configured to control the drives to move the carrier vehicle; or
the carrier vehicle is embodied as an omnidirectionally movable carrier vehicle.

5. The method of claim 1, wherein the at least one graph is a first graph, whereby the height, the angle, and the redundancy form a three-dimensional Cartesian coordinate system such that the redundancy is mapped out as a function of the height and the angle of the first graph.

6. The method of claim 5, wherein the redundancy in the first graph is marked with different colors or in grayscales.

7. The method of claim 1, wherein the at least one graph is a second graph in which the height is presented as a function of the angle, and the redundancy in the second graph is differently marked to present the redundancy as a function of the height and the angle.

8. The method of claim 7, wherein the differently marked graph comprises colors or grayscales.

9. The method of claim 1, further comprising:
altering the trajectory of the transformed planned path within the overlayed second graph when the planned path cannot be followed by the mobile robot 1, such that a revised trajectory of the transformed planned path is formed which can be followed by the mobile robot; and
creating a revised planned trajectory in six-dimensional space based on the revised trajectory of the transformed planned path.

10. The method of claim 1, wherein:
the tool is a gripper with which the mobile robot grips a workpiece and places the workpiece in a different position; and
the at least one graph is used to determine favorable positions for placing the workpiece in a different position.

11. A method for the redundancy-optimized planning of the operation of a redundant mobile robot, the mobile robot comprising a mobile carrier vehicle, a robot arm with a plurality of links connected by joints that pivotally mount the links with respect to axes of rotation, drives for moving the links relative to each other, and an electronic control device which is configured to control the drives for the links and the carrier vehicle for the movement of the mobile robot, the method comprising:
assigning a tool center point (TCP) of the robot arm to a TCP coordinate system having a first TCP-coordinate axis, a second TCP coordinate axis, and a third TCP coordinate axis;
identifying a Cartesian world coordinate system with a first world coordinate axis, a second world coordinate axis, and a third world coordinate axis;
wherein the first world coordinate axis and the second world coordinate axis span a plane on which the mobile robot moves, a height of the tool center point from the plane is defined along the third world coordinate axis, and the orientation of the tool center point is defined by an angle between the plane and one of the TCP coordinate axes;
creating at least one graph in which a redundancy of the robot is presented as a function of the height and the angle, wherein the redundancy is a measure of possible configurations of the mobile robot depending on the height and the angle;
planning an operation of the mobile robot with the help of the at least one graph;
wherein the at least one graph is a first graph, whereby the height, the angle, and the redundancy form a three-dimensional Cartesian coordinate system such that the redundancy is mapped out as a function of the height and the angle of the first graph;
selecting a height for the tool center point;
determining possible values of the angle with the help of at least one of the first graph or a second graph in which the height is presented as a function of the angle, and the redundancy in the second graph is differently marked to present the redundancy as a function of the height and the angle;
determining the value of the angle to which the highest redundancy is assigned; and
using the determined value of the angle for planning the movement of the mobile robot.

12. A method for the redundancy-optimized planning of the operation of a redundant mobile robot, the mobile robot comprising a mobile carrier vehicle, a robot arm with a plurality of links connected by joints that pivotally mount the links with respect to axes of rotation, drives for moving the links relative to each other, and an electronic control device which is configured to control the drives for the links and the carrier vehicle for the movement of the mobile robot, the method comprising:
assigning a tool center point (TCP) of the robot arm to a TCP coordinate system having a first TCP-coordinate axis, a second TCP coordinate axis, and a third TCP coordinate axis;
identifying a Cartesian world coordinate system with a first world coordinate axis, a second world coordinate axis, and a third world coordinate axis;
wherein the first world coordinate axis and the second world coordinate axis span a plane on which the mobile robot moves, a height of the tool center point from the plane is defined along the third world coordinate axis, and the orientation of the tool center point is defined by an angle between the plane and one of the TCP coordinate axes;
creating at least one graph in which a redundancy of the robot is presented as a function of the height and the angle, wherein the redundancy is a measure of possible configurations of the mobile robot depending on the height and the angle;
planning an operation of the mobile robot with the help of the at least one graph;
wherein the at least one graph is a first graph, whereby the height, the angle, and the redundancy form a three-dimensional Cartesian coordinate system such that the redundancy is mapped out as a function of the height and the angle of the first graph;
selecting the angle;
determining possible values of the height with the help of at least one of the first graph or a second graph in which the height is presented as a function of the angle, and the redundancy in the second graph is differently marked to present the redundancy as a function of the height and the angle;
determining the value of the height to which the highest redundancy is assigned; and using the determined value of the height for planning the movement of the mobile robot.

* * * * *